United States Patent
Miura et al.

(12) 
(10) Patent No.: US 6,334,210 B1
(45) Date of Patent: Dec. 25, 2001

(54) LANGUAGE PROCESSING SYSTEM AND LANGUAGE PROCESSING METHOD ENABLING REDUCTION OF MEMORY REGION AND OVERHEAD IN PROFILE INFORMATION COLLECTION OF COMPUTER

(75) Inventors: Takayuki Miura; Rika Ono, both of Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/237,259

(22) Filed: Jan. 26, 1999

(30) Foreign Application Priority Data

Jan. 26, 1998 (JP) .................................................. 10-012634

(51) Int. Cl.$^7$ .................................................. G06F 9/445
(52) U.S. Cl. .................................................. 717/4
(58) Field of Search .............................. 714/2, 53; 717/5; 712/217, 4; 379/230

(56) References Cited

U.S. PATENT DOCUMENTS

| | | | |
|---|---|---|---|
| 5,325,494 | * | 6/1994 | Imai et al. ............................ 712/217 |
| 5,606,699 | * | 2/1997 | De Pauw et al. ..................... 709/315 |
| 5,644,709 | * | 7/1997 | Austin .................................... 714/53 |
| 5,950,003 | | 9/1999 | Kaneshiro et al. . |
| 6,154,876 | * | 11/2000 | Haley et al. ............................. 717/4 |
| 6,160,883 | * | 12/2000 | Jacjson et al. ....................... 379/230 |

FOREIGN PATENT DOCUMENTS

| | | |
|---|---|---|
| 63-20638 | 1/1988 | (JP) . |
| 1-184541 | 7/1989 | (JP) . |
| 4-153743 | 5/1992 | (JP) . |
| 7-210424 | 8/1995 | (JP) . |
| 9-62544 | 3/1997 | (JP) . |
| 9-198246 | 7/1997 | (JP) . |

OTHER PUBLICATIONS

Programming Lauguages—Guide for the Use of the Ada Programming Language in High Integrity Systems, ISO/IEC, (1997).*

* cited by examiner

*Primary Examiner*—Mark R. Powell
*Assistant Examiner*—Michael B. Holmes
(74) *Attorney, Agent, or Firm*—Foley & Lardner (57) ABSTRACT

A language processing method detects function call in a source program by static analysis, inserts a branching code to profile process per function call detected in the source program and setting a region of a table storing number of times of corresponding function call per an identification number of call pair in function call, executes translation of the source program inserted the branching code to the profiling process, and increments number of function call of the table with taking the identification number corresponding to kind of call pair in corresponding function call, as index, when the inserted profiling process is present.

16 Claims, 10 Drawing Sheets

```
void main ()
{
    :
    :
    x1 = func1 (a) ;
    x2 = func2 (b) ;
    x3 = func3 (c) ;
    x4 = func1 (d) ;
    :
    :
}
```

FIG. 6

| IDENTIFICATION NUMBER (51) | CALLER (52) | CALLEE (53) |
|---|---|---|
| 1 | main | func 1 |
| 2 | main | func 2 |
| 3 | main | func 3 |
| : | : | : |

CALLER: CALLER SIDE FUNCTION
CALLEE: CALLEE SIDE FUNCTION

FIG. 7

```
void profile ( int id )                          ←— INSERT
{
    profile(id) INCREMENT ENTRY BY 1 WITH TAKING
    DESIGNATED IDENTIFICATION NUMBER (id)
}
void main ()
{
    :
    :
    profile ( 1 ) ;              ←— INSERT
    x1 = func1 ( a ) ;
    profile ( 2 ) ;              ←— INSERT
    x2 = func2 ( b ) ;
    profile ( 3 ) ;              ←— INSERT
    x3 = func3 ( c ) ;
    profile ( 1 ) ;              ←— INSERT
    x4 = func1 ( d ) ;
    :
    :
}
```

FIG. 8

NUMBER OF TIMES OF CALL

| | |
|---|---|
| 2 | |
| 1 | ~70 |
| 1 | |
| ⋮ | |

FIG. 9

| CALLER | CALLEE | NUMBER OF TIMES OF CALL |
|---|---|---|
| main | func 1 | 2 |
| main | func 2 | 1 |
| main | func 3 | 1 |
| ⋮ | ⋮ | ⋮ |

CALLER ID

|  | 1 | 2 | 3 | 4 | ... |
|---|---|---|---|---|---|
| CALLEE ID 1 | 0 | 0 | 0 | 0 | ... |
| 2 | 2 | 0 | 0 | 0 | ... |
| 3 | 1 | 0 | 0 | 0 | ... |
| 4 | 1 | 0 | 0 | 0 | ... |
| : | : | : | : | : |  | f ( caller , callee )

= [ ( caller + callee - 1 ) * ( caller + callee - 2 ) ] / 2 + callee - 1

ID CORRESPONDENCE TABLE

ID 1 = main

ID 2 = func 1

ID 3 = func 2

ID 4 = func 3

NUMBER OF TIMES CALL

| 0 |
|---|
| 0 |
| 2 |
| 0 |
| 0 |
| 1 |
| 0 |
| 0 |
| 0 |
| 1 |

⋮

| 0 |
|---|
| 0 |
| 0 |

⋮

| 0 |
|---|
| 0 |

⋮

LANGUAGE PROCESSING SYSTEM AND LANGUAGE PROCESSING METHOD ENABLING REDUCTION OF MEMORY REGION AND OVERHEAD IN PROFILE INFORMATION COLLECTION OF COMPUTER

BACKGROUND OF THE INVENTION

1. Field of the Invention

The present invention relates generally to a language processing system, a language processing method and a storage medium storing a language processing program. More particularly, the invention relates to a language processing system and a language processing method which can reduce a memory region necessary for profile information collection of a computer and can reduce overhead of the profile information collection upon program execution.

2. Description of the Related Art

For improving performance in execution of programs, it is quite effective to know behavior of programs on the basis of profile information. The profile information is information collected by dynamically monitoring times of execution, execution period of a particular portion, branching information and so forth. The profile information thus obtained is used as an analysis information of program. Optimization for improvement of execution speed and so forth is mainly performed on the basis of such profile information. The profile information is useful information enabling specific optimization of the program. Call pair information indicative of call frequency of caller/callee (caller side function/callee side function) in the program is one of such profile information.

Upon collecting profile information, particularly call pair information, there has been known a profile collecting method which reduces overhead cost in the profile information collection and make it constant, and enables calculation of the overhead. (see Japanese Unexamined Patent Publication No. Heisei 9(1997)-62544).

Figure 10:
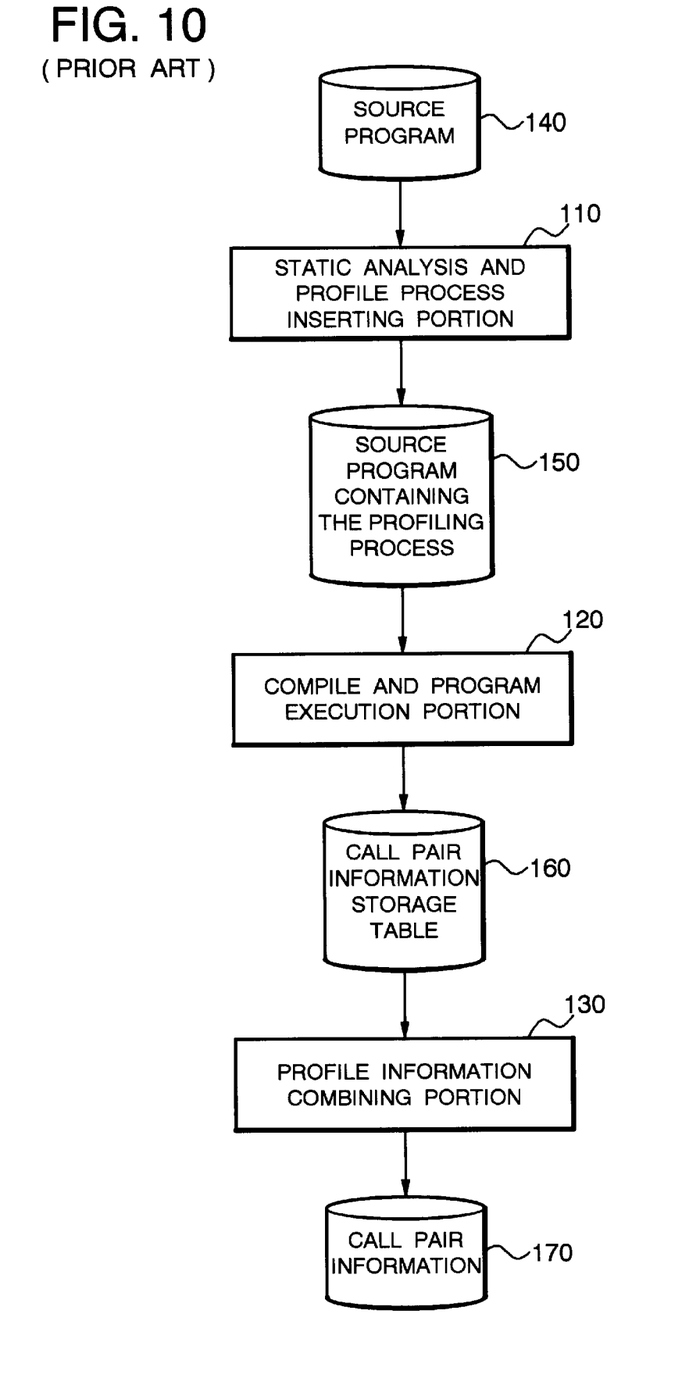
FIG. 10 is a block diagram showing electrical construction of the conventional profile information collecting system.
Figure 11A:
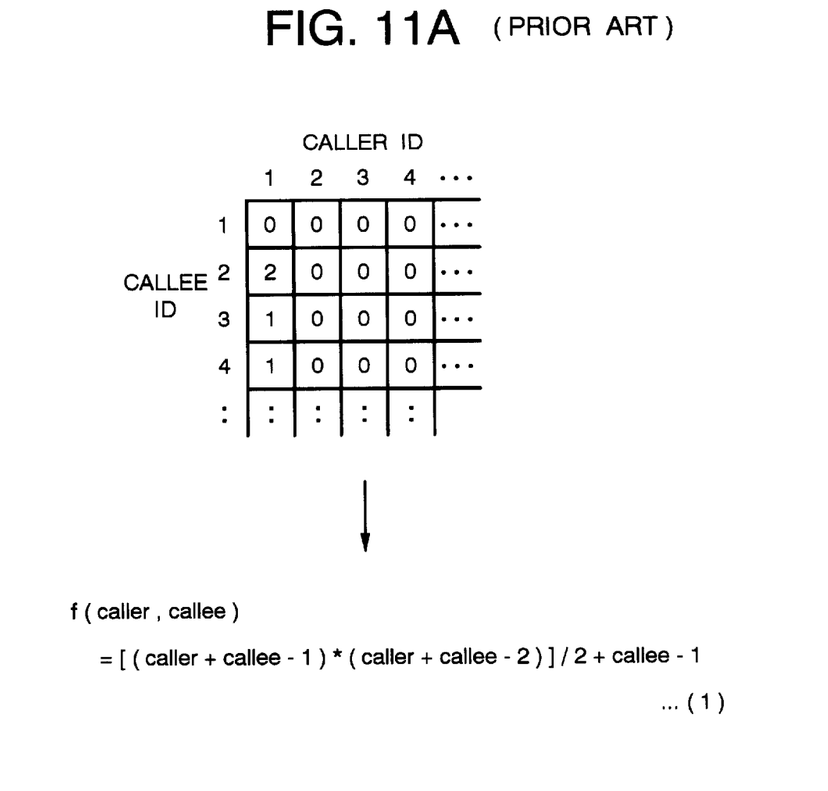
FIGS. 11A, 11B and 11C are explanatory illustration of a call pair information generating means in the conventional system.
Figure 11B:
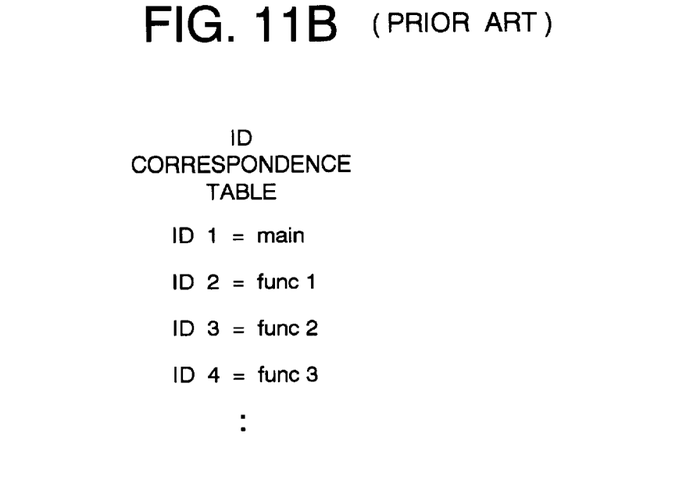
Figure 11C:
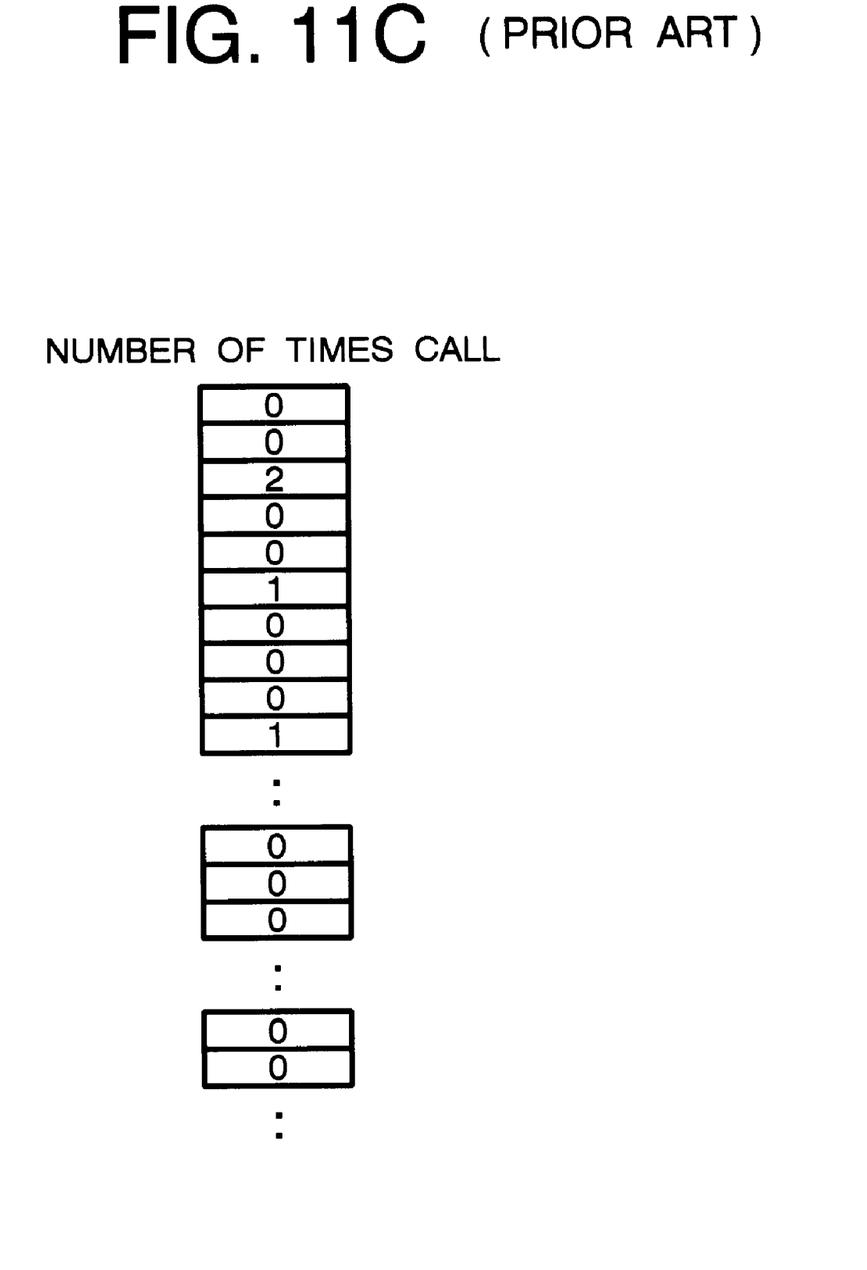

FIG. 10 is a block diagram showing a construction of the conventional profile information collecting system and FIGS. 11A, 11B and 11C are explanatory illustrations of a call pair information generating method in the system shown in FIG. 10.

Discussion will be given hereinafter for conventional profile information collecting method with reference to FIGS. 10 and 11A, 11B, 11C. In a profile process inserting portion 110 shown in FIG. 10, when a function call instruction is present in a source program 140, a source program containing a profiling process is generated by inserting a branching code to the profile information collection immediately before execution of the function call instruction. A compiling and program executing portion 120 executes compiling of the source program including the profile process. When profiling process is executed, a two-dimensional call pair information processing table shown in FIG. 11A is mapped with taking a callerID indicative of caller side function and a calleeID indicative of callee side function as argument to establish a linear call pair information storage table 160 shown in FIG. 11C. Then, calling number of the call pair is incremented by 1.

$$f(\text{caller, callee}) = [(\text{caller}+\text{callee}-1)*(\text{calleer}+\text{callee}-2)]/2+\text{callee} \quad (1)$$

In FIGS. 11A, ID1, ID2, ID3 and ID4 correspond main routine (labeled as "main"), a function (labeled as "func1"), a function (labeled as "func2") and a function (labeled as "func3"), respectively, as shown in FIG. 11B.

Upon end of program execution, in a profile information generating portion 130, with taking a value mapped according to the foregoing equation (1) as index, number of times of calling per each relevant call pair is read out from the linear table of the call pair information storage table 160. By recording the read out number of times of calling, a call pair information is output.

However, in the conventional profile information collecting method set forth above, in order to enable recording of number of times of calling for all call pair information in the program, necessary memory region has to be preliminarily reserved in a lump.

In this case, in a mutual relationship of all functions contained in the program, since it is possible to cause calling relationship, a two-dimensional table which can store number of times of calling for all possible combination (including call for the function in question per se) of all functions. Therefore, when number of functions contained in the program is large, a huge amount of capacity is required as a region for the table storing call pairs.

Furthermore, a long period is required for initializing process for such large region. Also, it takes a long period for mapping the two-dimensional call pair information storing table mapped in terms of both of the caller and callee in the linear call pair information storage table. Therefore, an overhead in profile process upon execution of the program becomes large. Also, it becomes necessary to derive (map) the index even upon outputting the call pair information to take a long period for such process to further increase the overhead in profile process upon program execution.

SUMMARY OF THE INVENTION

It is an object of the present invention to provide a language processing system and a language processing method which can make a memory region of a table to be used smaller upon collecting profile information in program execution.

Another object of the present invention is to provide a language processing system and a language processing method which can reduce an overhead due to profile process upon program execution as much as possible.

According to the first aspect of the invention, a language processing system collecting a profile information during execution of a program, comprises profile process inserting means for detecting function call in a source program by static analysis, inserting a branching code to profile process per function call detected in the source program and setting a region of a table storing number of times of corresponding function call per an identification number of call pair in function call, and program executing means for executing translation of the source program inserted the branching code to the profiling process, and incrementing number of function call of the table with taking the identification number corresponding to kind of call pair in corresponding function call, as index, when the branching code to the inserted profiling process is present.

In the preferred construction, the language processing system further comprises profile information outputting means for generating information of number of times of call per kind of call pair by reading out number of times of function call of the table per identification number.

In another preferred construction, the language processing system further comprises a database storing call pairs in the function call and identification number thereof, the profile process inserting means makes judgment whether the call pair in the detected function call is registered in the database and, if not, stores the call pair in the function call with adding the identification number per kind.

In another preferred construction, the language processing system further comprises a database storing call pairs in the function call and identification number thereof, the profile process inserting means makes judgment whether the call pair in the detected function call is registered in the database and, if not, stores the call pair in the function call with adding the identification number per kind, and which further comprises profile information outputting means for generating information of times of call per kind of call pair by reading out number of function call of the table per identification number of the data base.

In another preferred construction, the profile process inserting means performs initialization process upon setting of a region of the table.

In another preferred construction, the profile process inserting means sets corresponding to a maximum number of the identification number of a region of the table.

According to the second aspect of the invention, a language processing method collecting a profile information during execution of a program, comprises step of detecting function call in a source program by static analysis, inserting a branching code to profile process per function call detected in the source program and setting a region of a table storing number of times of corresponding function call per an identification number of call pair in function call, and step of executing translation of the source program inserted the branching code to the profiling process, and incrementing number of function call of the table with taking the identification number corresponding to kind of call pair in corresponding function call, as index, when the branching code to the inserted profiling process is present.

In the preferred construction, the language processing method further comprises step of generating information of number of times of call per kind of call pair by reading out number of times of function call of the table per identification number.

In another preferred construction, the language processing method further includes a database storing call pairs in the function call and identification number thereof, the profile process inserting step makes judgment whether the call pair in the detected function call is registered in the database and, if not, stores the call pair in the function call with adding the identification number per kind, which further comprises step of generating information of times of call per kind of call pair by reading out number of function call of the table per identification number of the data base.

In another preferred construction, the profile process inserting step performs initialization process upon setting of a region of the table.

In another preferred construction, the profile process inserting step sets corresponding to a maximum number of the identification number of a region of the table.

According to another aspect of the invention, a computer readable memory storing a language processing program to be loaded and executed in a computer for collecting a profile information during execution of an objective program, comprises detecting function call in a source program by static analysis, inserting a branching code to profile process per function call detected in the source program and setting a region of a table storing number of times of corresponding function call per an identification number of call pair in function call, and executing translation of the source program inserted the branching code to the profiling process, and incrementing number of function call of the table with taking the identification number corresponding to kind of call pair in corresponding function call, as index, when the inserted profiling process is present.

Other objects, features and advantages of the present invention will becomes apparent from detailed description given hereinafter.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding to those skilled in the art that the present invention may pending of the present invention. It will be obvious, however, practiced without these specific details. In other instance, well-known structures are not shown in detail in order to avoid unnecessarily obscure the present invention.

Figure 1:
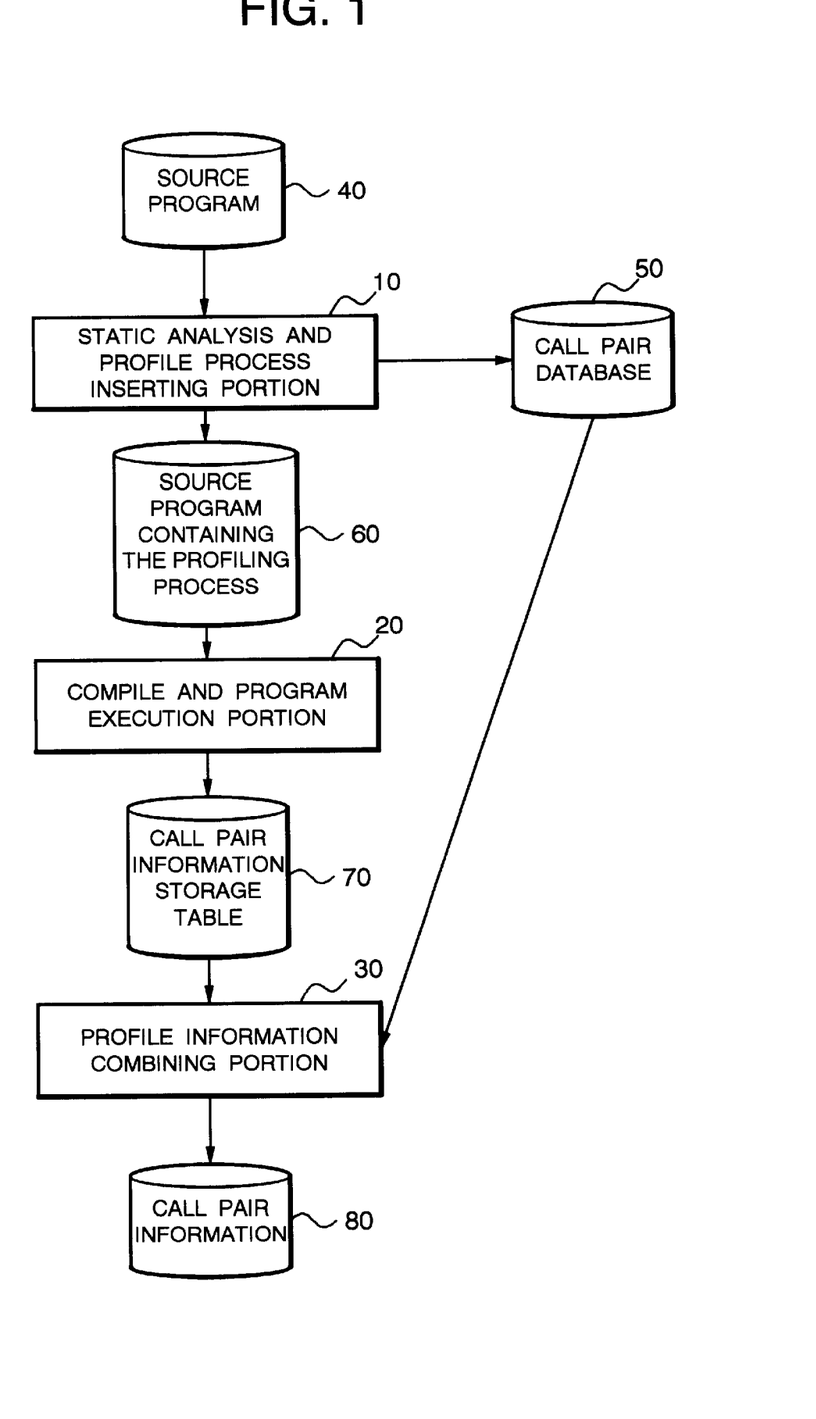
FIG. 1 is a block diagram showing a general construction of an electrical construction of one embodiment of a language processing system according to the present invention.
Figure 2:
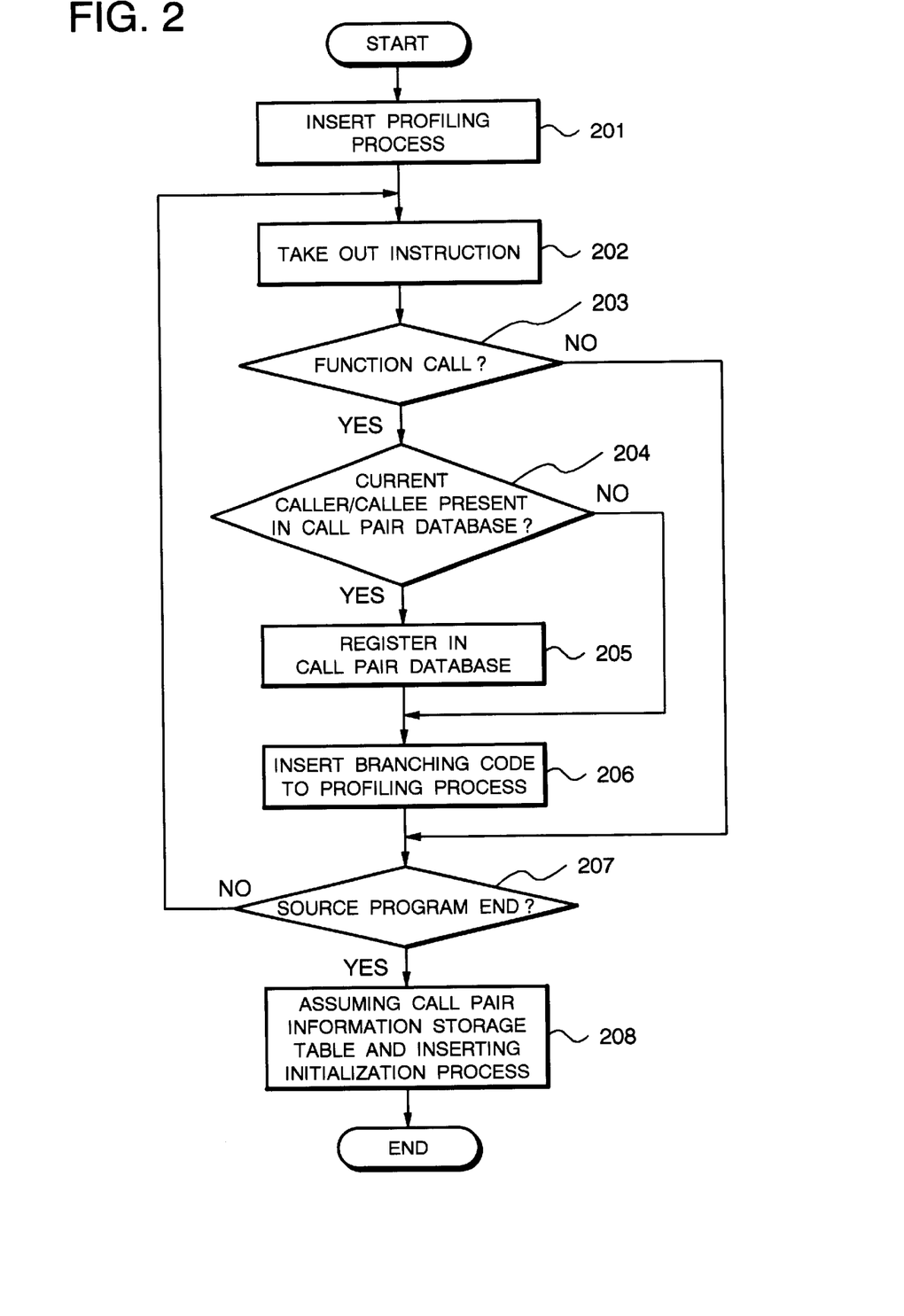
FIG. 2 is a flowchart showing a flow of process of a static analysis and profile process inserting portion in the system of FIG. 1.
Figure 3:
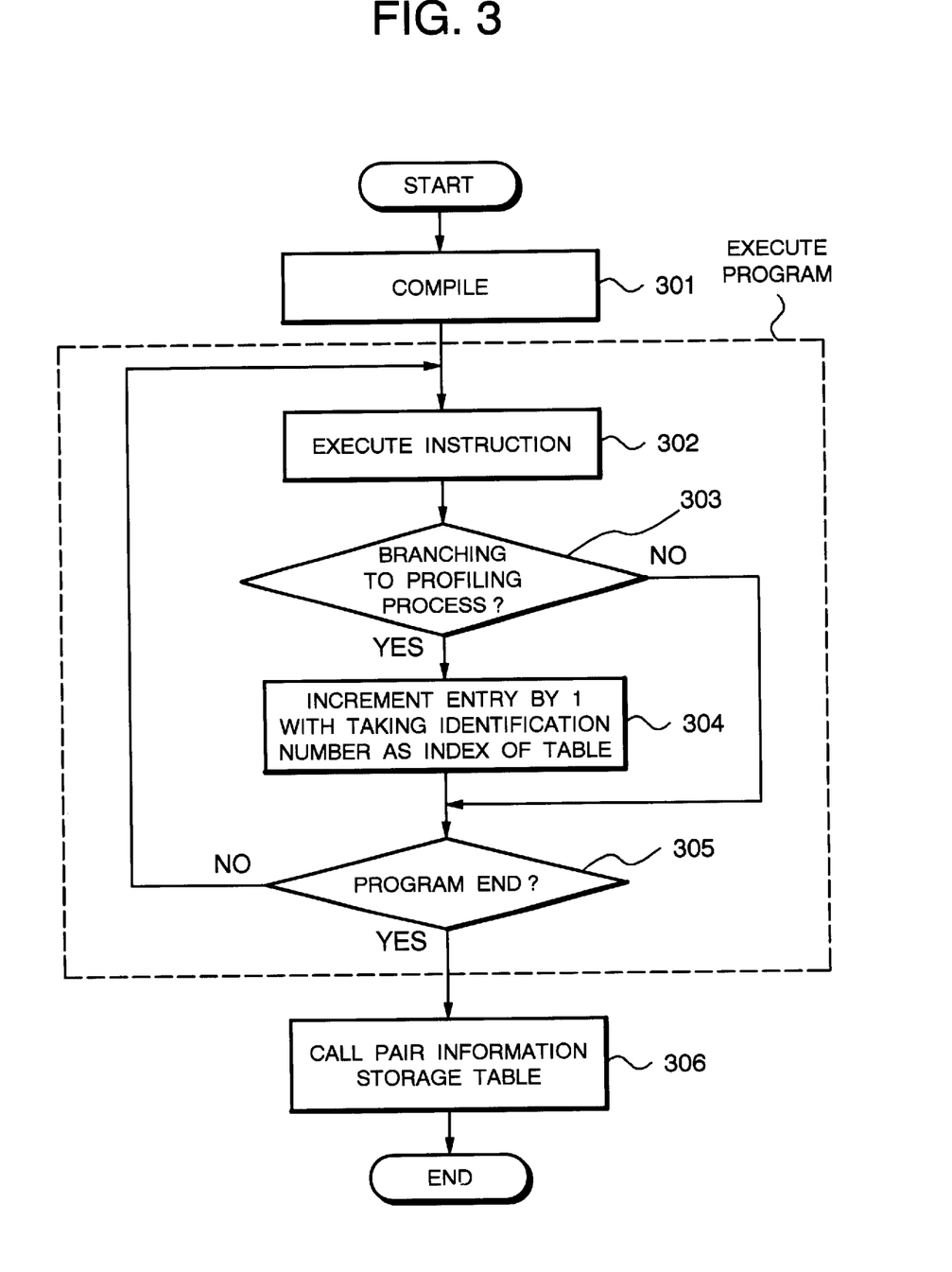
FIG. 3 is a flowchart showing a process of the process of a compiling program executing portion in the system of FIG. 1.
Figure 4:
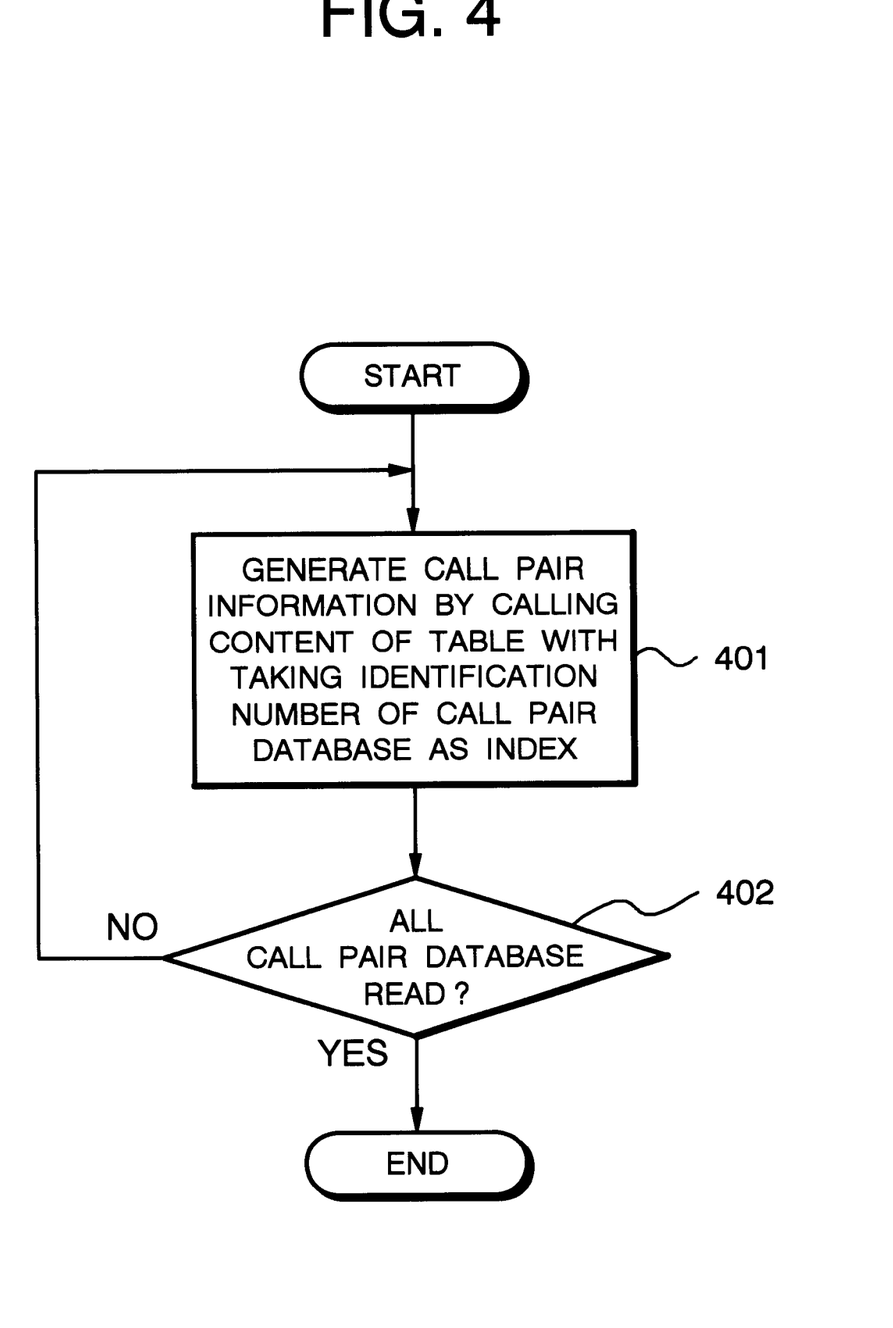
FIG. 4 is a flowchart showing a flow of the process of a profile information combining portion in the system of FIG. 1.
Figure 5:
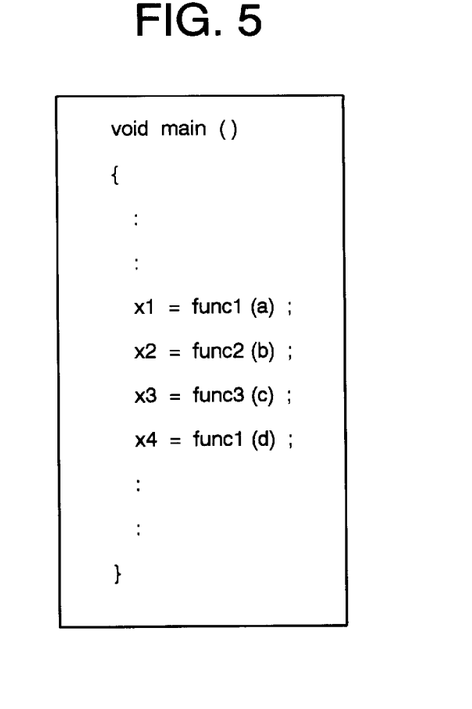
FIG. 5 is an explanatory illustration of a source program in the system shown in FIG. 1.
Figure 6:
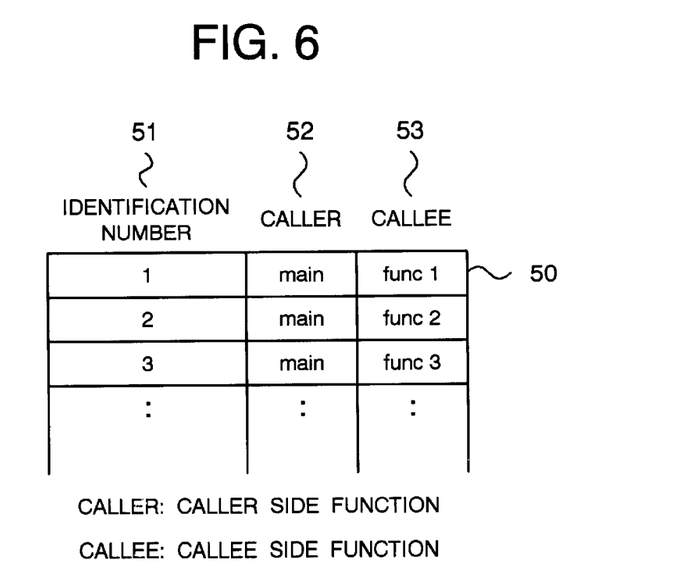
FIG. 6 is an explanatory illustration of a call pair data base in the system of FIG. 1.
Figure 7:
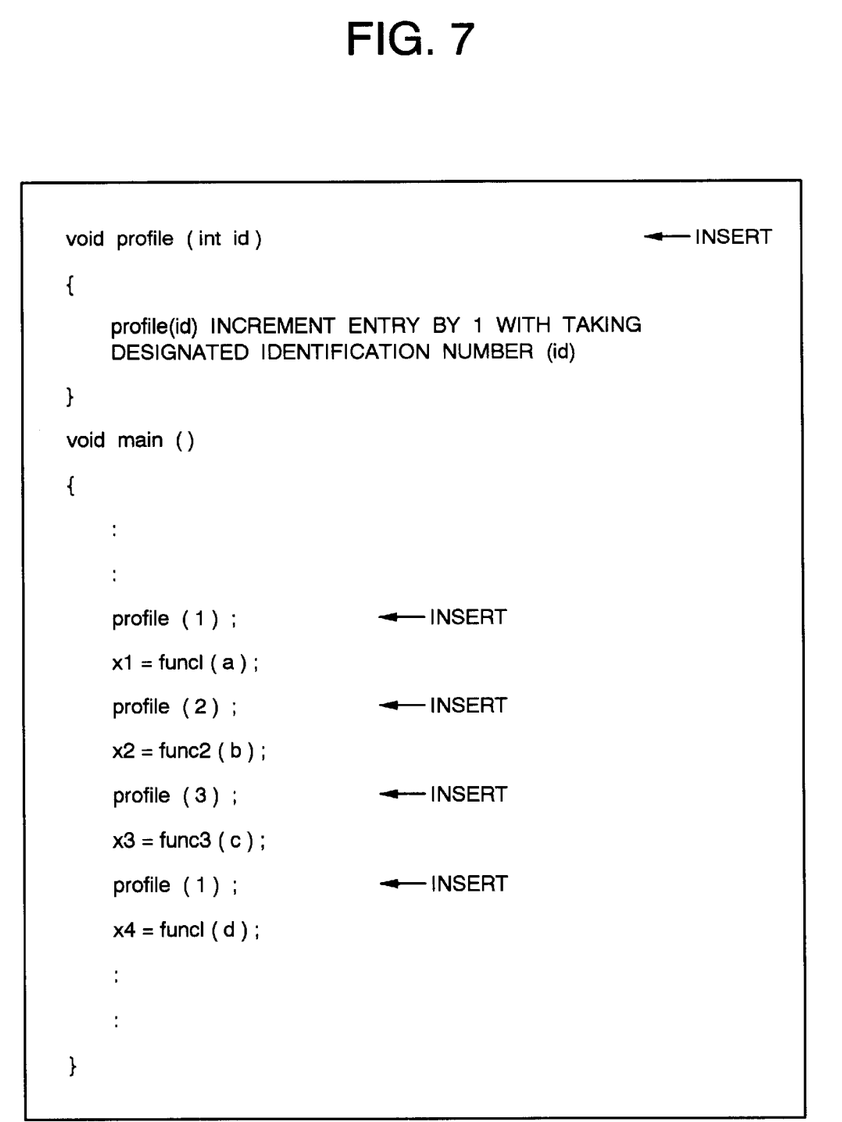
FIG. 7 is an explanatory illustration of a source program incorporating a profile process in the system shown in FIG. 1.
Figure 8:
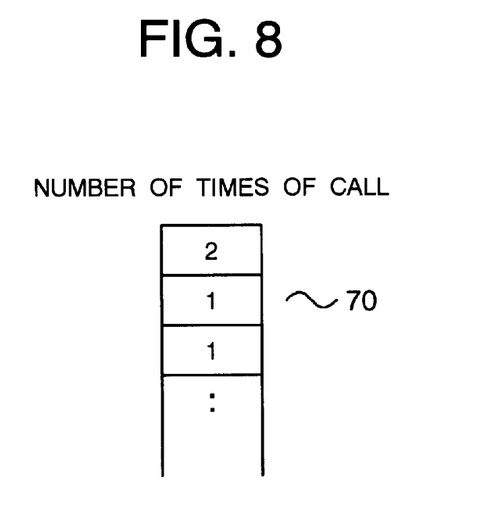
FIG. 8 is an explanatory illustration of a call pair information storage table in the system of FIG. 1.
Figure 9:
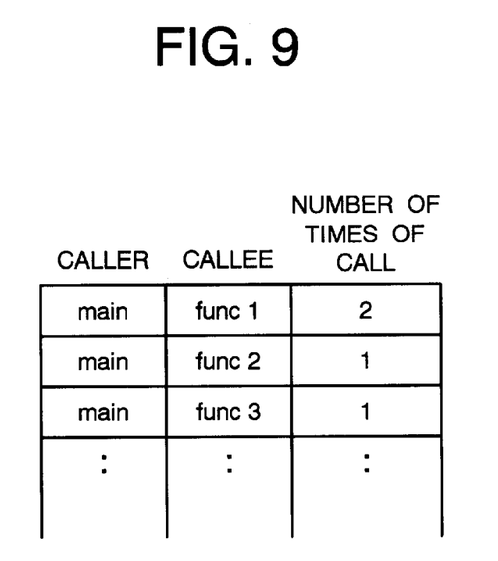
FIG. 9 is an explanatory illustration of a call pair information in the system shown in FIG. 1.

FIG. 1 is a block diagram showing a general construction of an electrical construction of one embodiment of a language processing system according to the present invention, FIG. 2 is a flowchart showing a flow of process of a static analysis and profile process inserting portion in the system of FIG. 1, FIG. 3 is a flowchart showing a process of the process of a compiling program executing portion in the system of FIG. 1, FIG. 4 is a flowchart showing a flow of the process of a profile information combining portion in the system of FIG. 1, FIG. 5 is an explanatory illustration of a source program in the system shown in FIG. 1, FIG. 6 is an explanatory illustration of a call pair data base in the system of FIG. 1, FIG. 7 is an explanatory illustration of a source program incorporating a profile process in the system shown in FIG. 1, FIG. 8 is an explanatory illustration of a call pair information storage table in the system of FIG. 1, and FIG. 9 is an explanatory illustration of a call pair information in the system shown in FIG. 1.

The shown embodiment of the language processing system according to the present invention, is generally constructed with a static analysis and profile process inserting portion 10, a compiling and program execution portion 20 and a profile information combining portion 30.

Here, the static analysis and profile process inserting portion 10 detects calling of a function in a source program 40 by static analysis. Then, an identification number of a call pair is registered in a call pair database 50 and a code for profile process is inserted in the source program 40. In conjunction therewith, a region for a call pair information storage table 70 for counts of number of times of call per call pair is set.

The compiling and program execution portion 20 executes compiling of the source program containing the profiling process, in which the profiling process is inserted. When the profiling process is performed, number of timing of call in the call pair information storage table 70 is incremented with taking the identification number of call pair in calling of function.

The profile information combining portion 30 reads out the content of the call pair information storage table 70 to generate a call pair information.

Next, operation of the shown embodiment of the language processing system will be discussed with reference to FIGS. 1 to 9.

It is assumed that a function call routine is included in a main routine of the source program 40, as shown in FIG. 5, for example. Here, it is also assumed that respective of a function func1, a function func2, a function func3, the function func1, . . . are called from the main routine labeled as "main" to perform calculation with respective arguments a, b, c, d, . . . , and to replace respective of x1, x2, x3, x4, . . . with resultant values.

In the static analysis and profile process inserting portion 10, static analysis is performed according to flowchart shown in FIG. 2 to perform a process of inserting code commanding the profiling process for the source program 40 (step 201 of FIG. 2).

Namely, one instruction is taken out from the source program 40 (step 202). Then, the instruction is checked whether it is function call instruction or not (step 203). If the instruction is the function call instruction, a pair (call pair) consisted of a caller ands a callee in function call is checked whether it is registered in the call pair database 50 or not (step 204).

If the result of checking at step 204 shows that the checked call pair is not registered in the call pair database 50, the call pair is registered in the call pair database 50 together with the identification number (step 205). When the checked call pair is registered in the call pair database 50 at step 204 or after registration in the call pair database at step 205, a branching code to the profiling process is inserted immediately before a branching code to the callee in the source program (step 206). Such process is repeated up to the end of the source program (step 207). After reaching to the end of the source program, so that number of times of call can be stored for all call pairs registered in the call pair database 50, a region for the call pair information storage table 70 as the linear table is set, and, in conjunction therewith, an initialization process for the set region is inserted in the source program (step 208). At this time, a size of the region of the call pair information storage table 70 is set at a size capable of storing call information of the call pairs in number corresponding to a maximum number of the identification number.

In the call pair database 50 thus completed registration, correspondences between the assigned identification numbers 51 and function names of caller 52 and callee 53 consisting the call pair are registered, as shown in FIG. 6.

On the other hand, by insertion of the profiling process for the source program 40, the source program 60 containing the profiling process as shown in FIG. 7 is generated. Namely, as profiling process instruction, a command for incrementing a relevant entry by one with taking the identification number of the call pair as index of the call pair information storage table 70. Also, a code for performing branching to the profiling process is inserted immediately before a branching code to the callee per each function call instruction.

Next, in the compiling and program executing portion 20, process as shown by flowchart of FIG. 3 is performed. At first,the source program 40 is complied (step 301 of FIG. 3). Then, program translated into an executable format is executed. By executing instruction in the program (step 302), check is performed whether the currently executed instruction is for branching to the profiling process or not (step 303). If the currently executed instruction is for branching to the profiling process, number of times of calling of the relevant call pair is incremented by one with taking the identification number as index of the call pair information storage table 70 (step 304). After repeating the foregoing process up to the end of the complied program (step 305), the call pair information storage table 70 us stored in a form of file, for example (step 306).

Next, the profile information combining portion 30 performs process shown by the flowchart in FIG. 4. At first, the content of the call pair information storage table 70 is read out with taking the identification number of the call pair database 50 as index, and a call pair information containing number of times of call of the call pair is generated (step 401 of FIG. 4). When reference to all identification numbers of the call pair database 50 is completed by repeating the foregoing process (step 402 of FIG. 4), a process for outputting the call pair information ends.

In the shown example, the content of the call pair information storage table is as illustrated in FIG. 8. Numbers of times of call of respective call pairs are recorded in sequential order of identification numbers of respective call pairs. In the call pair information output from the profile information combining portion 30, names of callers and callees of respective call pairs and number of times are recorded in sequential order of the identification number of respective call pairs.

While the present invention has been discussed in detail in terms the preferred embodiment illustrated in the accompanying drawings, any modifications or change in design which can be made without departing from the principle of the present invention should be understood as being encompassed within a scope of the present invention. For instance, the language to be used for programming is not limited to a high-level language but also can be assembly language, machine language and other low-level language. While FORTRAN or C language maybe preferred as the high-level language, any of ALGOL, COBOL, PL/I, BASIC and any other equivalent language may be applicable.

Initialization of the call pair information storage table is not limited to that upon setting of the region but can be any arbitrary timing before writing of number of times of call. On the other hand, the size of the region for the call pair information storage table may be any arbitrary size as long as it is greater than that required for storing maximum number of identification numbers.

The shown embodiment of the language processing system set forth above is realized by program-controlled CPU and RAN or other internal memory in the work station, personal computer and other computer systems. The language processing program realizing the foregoing function is provided in a formed stored in typical storage medium, such as magnetic disc, optical disc, semiconductor memory and so forth. The language processing program stored in the storage medium is loaded in the internal memory of the computer system to control CPU to realize functions of respective components.

As set forth above, in the profiling process collecting the call pair information, a memory region to be used as a table for storing the call pair information can be made small. On the other hand, in the profiling process during program execution, overhead for collection of call pair information and overhead for outputting of call pair information can be made small.

Namely, in the present invention, upon execution of the program for profiling process, kind of the call pair contained in the program is preliminarily checked by the static analysis to maintain in the call pair database and a memory region corresponding to number of kinds of the call pairs is certainly provided as the call pair information storage table, the region required as the call pair information storage table can be made smaller in comparison with the method providing a region for storing number of times of function call corresponding to all premised call pairs from kinds in the program.

On the other hand, by storing the call pair obtained through static analysis with the identification number in the call pair database, and performing collection of the profile information by incrementing the relevant entry in the call pair information storage table with taking the identification as index upon detection of function call in the program, overhead due to profiling process during program execution can be made smaller in comparison with the method retrieving caller ID and callee ID respectively upon detecting function call and entering into the call pair information storage table as in the prior art.

Furthermore, since number of times of call per call pair can be directly output as call pair information from the call pair information storage table, overhead due to profiling process during execution of the program can be made smaller in comparison with the method obtaining call pair information from the linear table obtained by mapping from the two-dimensional table as in the prior art.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A language processing system for collecting profile information during execution of a source program, comprising:

profile process inserting means for detecting a function call in said source program by static analysis, inserting a branching code into a profile process corresponding to said detected function call, and creating a region in a table for storing a number of occurrences of said detected function call, the location of said region within said table corresponding to a numerical identifier of a call pair of the detected function call; and program executing means for executing translation of said source program including branching codes inserted into the profile process corresponding to said source program, and incrementing a number of occurrences stored in the table in a region corresponding to a numerical identifier of a call pair of a detected function call when a branching code is present.

2. A language processing system as set forth in claim 1, further comprising:

profile information outputting means for outputting a number of occurrences of a function call by reading out a number of occurrences in a region corresponding to a numerical identifier of the call pair of the function call in the table.

3. A language processing system as set forth in claim 1, further comprising:

a database storing call pairs associated with function calls and the identifiers thereof, and wherein said profile process inserting means determines whether a call pair of a detected function call is registered in said database and, if not, stores the call pair of the detected function call in association with a numerical identifier of the call pair.

4. A language processing system as set forth in claim 3, further comprising:

profile information outputting means for outputting a number of occurrences of a function call by reading out a number of occurrences stored in a region of the table corresponding to a numerical identifier of a call pair of the function call.

5. A language processing system as set forth in claim 1, wherein said profile process inserting means performs an initialization process upon creating a region of said table.

6. A language processing system as set forth in claim 1, wherein said profile process inserting means creates a number of regions of said table corresponding to a maximum number of call pairs.

7. A language processing method for collecting profile information during execution of a source program, comprising:

profile process insertion comprising detecting a function call in said source program by static analysis, inserting a branching code into a profile process corresponding to said detected function call, and creating a region in a table for storing a number of occurrences of said detected function call, the location of said region within said table corresponding to a numerical identifier of a call pair of the detected function call; and program execution comprising executing translation of said source program including branching codes inserted into the profile process corresponding to said source program, and incrementing a number of occurrences stored in the table in a region corresponding to a numerical identifier of a call pair of a detected function call when a branching code is present.

8. A language processing method as set forth in claim 7, further comprising:

outputting a number of occurrences of a function call by reading out a number of occurrences in a region corresponding to a numerical identifier of the call pair of the function call in the table.

9. A language processing method as set forth in claim 7, wherein said profile process insertion comprises determining whether a call pair of a detected function call is registered in said database and, if not, storing the call pair of the detected function call in association with a numerical identifier of the call pair, and wherein said method further comprises outputting a number of occurrences of a function call by reading out a number of occurrences in a region corresponding to a numerical identifier of the call pair of the function call in the table.

10. A language processing method as set forth in claim 7, wherein said profile process insertion comprises performing an initialization process upon creating a region of said table.

11. A language processing method as set forth in claim 7, wherein said profile process insertion comprises creating a number of regions of said table corresponding to a maximum number of call pairs.

12. A computer readable memory storing a language processing program to be loaded and executed in a computer to collect profile information during execution of a source program, the processing comprising:

profile process insertion comprising detecting a function call in said source program by static analysis, inserting a branching code into a profile process corresponding to said detected function call, and creating a region in a table for storing a number of occurrences of said detected function call, the location of said region within said table corresponding to a numerical identifier of a call pair of the detected function call; and program execution comprising executing translation of said source program including branching codes inserted into the profile process corresponding to said source program, and incrementing a number of occurrences stored in the table in a region corresponding to a numerical identifier of a call pair of a detected function call when a branching code is present.

13. A computer readable memory as set forth in claim 12, the processing further comprising:

outputting a number of occurrences of a function call by reading out a number of occurrences in a region corresponding to a numerical identifier of the call pair of the function call in the table.

14. A computer readable memory as set forth in claim 12, wherein said profile process insertion comprises determining whether a call pair of a detected function call is registered in said database and, if not, storing the call pair of the detected function call in association with a numerical identifier of the call pair, and wherein said processing further comprises outputting a number of occurrences of a function call by reading out a number of occurrences in a region corresponding to a numerical identifier of the call pair of the function call in the table.

15. A computer readable memory as set forth in claim 12, wherein said profile process insertion comprises performing an initialization process upon creating a region of said table.

16. A computer readable memory as set forth in claim 12, wherein said profile process insertion comprises creating a number of regions of said table corresponding to a maximum number of call pairs.

\* \* \* \* \*